United States Patent [19]

Hehl

[11] Patent Number: 4,690,436
[45] Date of Patent: Sep. 1, 1987

[54] PIPE COUPLING

[76] Inventor: Karl Hehl, Arthur-Hehl-Strasse 32, 7298 Lossburg 1, Fed. Rep. of Germany

[21] Appl. No.: 738,469

[22] Filed: May 28, 1985

[30] Foreign Application Priority Data

May 29, 1984 [DE] Fed. Rep. of Germany ....... 3419999

[51] Int. Cl.⁴ ........................................... F16L 19/00
[52] U.S. Cl. .................................. 285/321; 285/348; 285/353; 285/356
[58] Field of Search ............... 285/353, 384, 321, 356, 285/382.2, 348, 354

[56] References Cited

U.S. PATENT DOCUMENTS

| | | | |
|---|---|---|---|
| 690,797 | 1/1902 | Vail | 285/353 X |
| 2,121,558 | 6/1938 | Coe et al. | 285/382.2 X |
| 2,192,914 | 3/1940 | Ice | 285/382.2 X |
| 2,358,408 | 9/1944 | McMurray | 285/356 X |
| 2,567,243 | 9/1951 | Smith | 285/348 |
| 3,315,987 | 4/1967 | White | 285/353 X |
| 3,343,252 | 9/1967 | Reesor | 285/382.2 X |
| 3,485,517 | 12/1969 | Howe | 285/348 X |
| 3,615,109 | 10/1971 | Brinda et al. | 285/332.2 |
| 3,733,093 | 5/1973 | Seiler | 285/356 X |
| 3,871,691 | 3/1975 | Takagi et al. | 285/321 |
| 3,898,163 | 8/1975 | Mott | 285/348 X |
| 4,068,863 | 1/1978 | Lasko | 285/356 X |
| 4,258,943 | 3/1981 | Vogt et al. | 285/348 X |

FOREIGN PATENT DOCUMENTS

| | | | |
|---|---|---|---|
| 541021 | 5/1957 | Canada | 285/384 |
| 363983 | 11/1922 | Fed. Rep. of Germany . | |
| 1535786 | 2/1943 | Fed. Rep. of Germany . | |
| 1077120 | 11/1954 | France | 285/356 |
| 904566 | 8/1962 | United Kingdom . | |
| 957525 | 5/1964 | United Kingdom | 285/321 |
| 2070708 | 9/1981 | United Kingdom . | |

Primary Examiner—Thomas F. Callaghan
Attorney, Agent, or Firm—Joseph A. Geiger

[57] ABSTRACT

A pipe coupling having an annular gasket deformed and compressed within a closed gasket chamber to form a seal for a pressurized hydraulic line, for example, one wall of the gasket chamber being formed by the outer surface of a pipe end portion which is to be connected either to a second pipe end portion or to a wall port. The axial width of the gasket chamber is determined by an abutment of the end face of the pipe end portion which transmits the abutment force to a threaded clamping sleeve or, as the case may be, to a coupling nut with the aid of a snap ring which engages a peripheral groove of the pipe end portion and a thrust shoulder of the threaded clamping sleeve. The pipe-to-pipe version of the coupling has two annular gaskets inside identical gasket chambers on opposite axial sides of a centering sleeve which surrounds both pipe end portions.

10 Claims, 21 Drawing Figures

PIPE COUPLING

BACKGROUND OF THE INVENTION

1. Field of the Invention

The present invention relates to pipe couplings and, more particularly, to repeatedly disconnectable and reconnectable threaded pipe couplings for high pressure lines featuring an annular gasket under compression inside a gasket chamber as a sealing element.

2. Description of the Prior Art

A number of different pipe couplings, including pipe couplings adapted for either pressure line applications or vacuum line applications, or both, are known from the prior art. Many of these couplings are not suitable for repeated disconnection and reconnection, because they rely on a permanent deformation of a coupling component to produce the required seal.

It has therefore already been suggested to use an elastically deformable and/or compressible annular gasket in a threaded pipe coupling, in order to produce a reliable seal between the mating coupling components which can be released and reestablished.

Two threaded pipe couplings featuring an annular gasket are disclosed in German Pat. No. 363 983 and in U.S. Pat. No. 3,615,109. Both pipe couplings produce a reliably sealed pipe union and both are readily reconnectable after disconnection. Depending on circumstances, it may be advantageous to replace the annular gasket prior to reconnection. Both of these known pipe couplings also have cooperating radial shoulders on their coupling components, for the axial force transfer from one coupling component to the other, thus meeting the highest demands of tightness and mechanical resistance to axial separation.

However, these known pipe couplings have a common shortcoming, inasmuch as, for the accommodation of the annular gasket, the two pipe ends must be fitted with permanently attached special end pieces which cooperate to form a chamber inside which the gasket is compressed.

In the case of German Pat. No. 363 983, the gasket chamber is of trapezoidal shape, being constituted by two parallel opposing radial pressure faces on the two end pieces, a slightly conical bore in one end piece and an oppositely tapered extension on the other end piece. The radial pressure faces reach beyond the radial width of the gasket, so that each pressure face comes to bear against an abutment face of the opposite end piece in the connected position. The result is a predetermined size of the gasket chamber in the connected position. The annular gasket has to have a comparable trapezoidal cross section.

In the case of U.S. Pat. No. 3,615,109, the annular gasket is an O-ring, the gasket chamber consisting of an interior annular groove in on of the two end pieces, the proximate flank of the groove being truncated by a conical interior face which cooperates with a matching conical exterior face on the extremity of the opposite end piece. The latter thus penetrates into the gasket chamber in the connected position, until the two conical faces abut against each other, thereby producing a triangular gasket chamber. As a result, the cross section of the O-ring is deformed from its circular shape into a triangular shape.

Both prior art solutions have the additional shortcoming of offering no protection against pinching of the gasket, or, under extreme pressure conditions, the extrusion of the gasket into the gaps between the surfaces which form the gasket chamber.

Lastly, neither of these two pipe couplings is adaptable for use as a coupling between a pipe and a wall port of the kind which are found in cylinder assemblies, valve blocks and other types of housings.

Another known pipe coupling with annular gaskets, intended for use in high vacuum equipment, is disclosed in British Pat. No. 904,566. This pipe coupling suggests the use of two O-rings which are confined inside, and deformed by, triangular gasket chambers, in a configuration in which the walls of each gasket chamber are constituted by the outer diameter of the end portion of one of the two pipes, a conical recess or chamfer in a flanged sleeve or tail which is soldered to the pipe end portion, and a spacer ring which receives and centers the two pipe end portions while abutting against the flanged sleeves. This abutment determines the size of the triangular gasket chambers.

Since this pipe coupling is designed for vacuum applications only, the problems of potential gasket extrusion and of preventing an axial separation of the coupling components do not exist. The suggested pipe coupling is not suitable for use as a high-pressure pipe coupling.

The German Gebrauchsmuster (Utility Model) No. 1 535 786 discloses a pipe coupling featuring an annular gasket of copper or leather which is confined between the planar end faces of two pipes and the bore of a central sleeve receiving the end portions of the two pipes. This coupling can also be used for the attachment of a pipe to a wall port, in which case the pipe end portion is received in a recessed bore.

The axial clamping attachment is obtained by means of two threaded sleeves—a single threaded sleeve in the case of a wall port—which surround the pipe end portions. Two snap rings which are engaged in shallow grooves on the outer side of the pipe end portions and protrude into recesses of the threaded clamping sleeves transmit the axial clamping force from the clamping sleeves to the pipe end portions.

This pipe coupling differs from the previously described pipe couplings, inasmuch as the gasket is not surrounded by a gasket chamber, but is confined on only three of the four sides of a rectangle. It follows that this pipe coupling can withstand only limited internal pressure.

Heretofore, the most widely used pipe coupling for high pressure hydraulic lines has been a pipe coupling which uses a thin-walled, slightly tapered metallic sleeve which is forced into a matchingly tapered bore of an opposing coupling component, so as to be deformed to a smaller diameter. The metallic sleeve has a bore with two shallow grooves near its leading edge forming a succession of three interior annular cutting edges which, as the sleeve is advanced and radially deformed, successively penetrate the outer surface of the pipe end portion to create angled annular grooves, for a reliable axial force transmission from the associated threaded coupling component to the pipe. The creation of the first angular groove, which is the deepest of the three, simultaneously produces a small annular ridge ahead of the groove which is forced against the tapered bore of the opposing coupling component for a reliable metal-to-metal seal.

This pipe coupling is most effective as initially assembled. While it is possible to disconnect and reconnect this coupling, the quality of the reconnected pipe coupling is always inferior, due to the absence of the virgin metal deformation which takes place during the first clamping operation, as described above.

SUMMARY OF THE INVENTION

Underlying the present invention is the primary objective of creating an improved pipe coupling for pressure lines, especially hydraulic pressure lines, which is suitable both for the connection of two pipe ends and for the connection of a pipe end to a wall port or block port, additional requirements for the improved pipe coupling including the capability of being disconnected and reconnected an unlimited number of times, without impairment of the quality of its seal, the capability of safely withstanding very high internal pressures, and the minimization of the preparatory operations to be performed on the pipe ends, prior to their connection, so as to make it possible to produce low-cost, reliable pipe coupling in the field with a minimum of special tools.

The present invention proposes to attain these objectives by suggesting an improved pipe coupling in which the cylindrical outer surface of each pipe end portion forms a surface portion of a closed chamber inside which is arranged an annular gasket of elastically deformable high-polymer material, another surface portion of the gasket chamber being formed by a pressure ring which is axially clamped against the annular gasket by means of a threaded clamping member, such as a threaded clamping sleeve, for example.

The axial width of the gasket chamber is determined by the abutment of the end face of the pipe end portion, as the latter is being advanced in the direction of clamping displacement in unison with the threaded coupling member. In the case of a pipe-to-pipe coupling, the pipe end portion abuts against the end face of another pipe end portion and, in the case of a pipe-to-wall-port coupling, the end face of the pipe end portion abuts against a recessed shoulder in a wall member which forms part of the wall port.

Both types of pipe coupling preferably use the same threaded clamping sleeve which has a pressure face oriented toward the gasket chamber and a thrust shoulder recessed from the pressure face. A snap ring of hardened wire is engaged in an annular groove of the pipe end portion in such a way that one-half of its diameter projects from that groove for cooperation with the thrust shoulder of the threaded clamping sleeve, so as to force the pipe end portion to move in unison with the threaded clamping sleeve, while transmitting the abutment force from the pipe end portion to the threaded clamping sleeve at the end of the clamping displacement.

A pressure ring arranged axially between the pressure face of the threaded clamping sleeve and the annular gasket forms an axially movable wall of the gasket chamber, while distributing the axial clamping pressure over the entire radial height of the annular gasket.

The radially outer wall of the gasket chamber, at least within the displacement range of the the pressure ring, is preferably formed by a portion of a cylindrical bore which is concentric with the cylindrical outer surface of the pipe end portion, and the pressure ring is arranged to slide against both cylindrical surfaces with a displacement gap of minimal clearance.

Only in this way is it possible to prevent the "extrusion" of some of the material of the annular gasket from the gasket chamber, as the gasket chamber is axially narrowed and the annular gasket is deformed under elevated clamping pressure, until it fills out the entire space of the gasket chamber.

In the case of a wall port coupling, both the radially outer surface of the gasket chamber and the axial surface of the chamber facing against the pressure ring are formed by portions of a stepped bore in the wall member of the coupling.

For a pipe-to-pipe coupling, the invention suggests the use of two annular gaskets in two identical gasket chambers on opposite axial ends of a centering sleeve which surrounds the pipe end portions and, in turn, is surrounded by a coupling nut taking the place of the wall member. Between an end flange of the coupling nut and the second pipe end portion is arranged the same axial thrust connection as between the threaded clamping sleeve and the first pipe end portion.

In addition to its simplicity and sealing effectiveness, this configuration makes it possible for all the coupling and sealing components to be removed form the pipe end portions. Such removal only requires the removal of the snap rings from their annular grooves, following which the threaded clamping sleeve and the coupling nut are free to slide off their respective pipe end portions.

This feature offers two advantages: firstly, when the pipe is to be passed through a wall, the opening required in that wall can be as small as the diameter of the pipe itself; secondly, the clamping components as well as the sealing components—annular gasket and pressure ring—can be replaced at any time, if worn or damaged.

The pipe coupling of the present invention lends itself ideally for adaptation to different pressure conditions, in terms of the choice of shape and material of the annular gasket and in terms of the cross-sectional shape of the gasket chamber. Thus, for applications which require an extremely high clamping pressure against the annular gasket, the invention suggests the addition of an intermediate ring of slightly deformable plastic material between the pressure ring and the annular gasket. Under the elevated axial clamping pressure, the intermediate ring is compressed axially and extended radially into firm contact with the inner and outer faces of the gasket chamber, thereby positively precluding the extrusion of gasket material from the gasket chamber. It thus becomes possible to use a softer material for the annular gasket.

Lastly, the present invention also suggests a novel groove coining tool for the creation of the annular grooves in the pipe end portions in a cold-working operation. Thanks to the proposed tool, an annular groove, as required for the novel pipe coupling, can be produced quickly and effortlessly in the field.

The groove coining tool is a hand tool which is comparable to a plumber's pipe cutter, using two supporting rolls and a coining roll which is advanced against the pipe under relative rotation between the pipe and the tool. A peripheral ridge on the coining roll impresses the rounded annular groove in the outer surface of the pipe end portion, while the surface portions of the pipe adjoining the annular groove on both sides are compacted and smoothed by the three rolls.

BRIEF DESCRIPTION OF THE DRAWINGS

Further special features and advantages of the invention will become apparent from the description following below, when taken together with the accompanying drawing which illustrate, by way of example, preferred embodiments of the invention which are represented in the various figures as follows.

DESCRIPTION OF THE PREFERRED EMBODIMENTS

The drawings show two primary embodiments of the invention in the form of a pipe coupling between a pipe end portion and a wall port and a pipe coupling between two pipe end portions, as well as several modifications relating to the gasket chamber 24 inside which an annular gasket 11 or 11' is confined and compressed. These modifications are equally applicable to either of the two primary embodiments. The various embodiments shown have a number of features in common:

Within an axially closable gasket chamber 24 of each pipe coupling is arranged an elastically deformable annular gasket 11 or 11', the gasket chamber 24 being forcibly closable to a predetermined axial width by means of two cooperating threaded coupling components. The latter, when screwed together, execute a relative axial clamping displacement which is limited by axial abutment means, so as to establish a predetermined axial width of the gasket chamber 24 in the connected position of the pipe coupling.

The gaps which are necessary to permit the closing of the gasket chamber 24, under the relative axial displacement of the coupling components, are formed along matching cylindrical faces and are of minimal radial width, i.e. wide enough to allow for air to escape from the gasket chamber 24 as it is reduced to its closed axial width.

As the coupling components are clamped together to close the gasket chamber 24, the annular gasket 11 inside the chamber is axially compressed and deformed in its cross section, until it occupies the entire cross section of the gasket chamber, while exerting a substantially even pressure against all constituent faces of the gasket chamber 24.

The annular gasket is of a high-polymer material, preferably polyurethane or a polyurethane-rubber-type compound, having a hardness on the shore scale comprised between 60 and 90. The lower elasticity limit of the annular gasket is chosen in such a way that the annular gasket assumes the negative profile of the gasket chamber 24 almost like a liquid which is compressed within a closed pressure space. Following the disconnection of the pipe coupling, it is not necessary for the annular gasket to fully resume its original cross-sectional profile, as it is normally preferable and more convenient to simply replace the annular gasket with a new part.

The abutment means which limit the relative axial displacement of the coupling components in the clamping operation are preferably provided by the two pipe members which are being connected, i.e. the two pipe end portions 14 in the case of a pipe-to-pipe coupling, or the wall member 10 and a pipe end portion 14, in the case of a pipe-to-wall-port coupling. Accordingly, it is in all cases an end face of the pipe end portion 14 which serves as one of the abutting faces.

At the beginning of the actual clamping displacement, the cooperating abutment faces are thus separated by an axial compression gap y (FIGS. 4a, 5a and 5b) which corresponds to the axial deformation to which the annular gasket is subjected in the connected position of the pipe coupling. Once abutted against each other under the action of the two threaded coupling components, the two pipe components form a rigidly connected union.

While it is possible to configurate the pipe coupling in such a way that the two pipe components are not abutting against each other in the connected position of the pipe coupling, it has been found, as a result of long-term operational testing, that such a configuration allows for the occurrence of micro-displacements under operational pressure changes, with the consequent creation of abrasion and frictional rust in the pipe coupling, especially in the case where a sleeve member engages the two pipe end portions without radial clearance.

Following is a more detailed description of the preferred embodiments and their modifications, with specific reference to the various figures of the drawing:

FIGS. 1, 3–3n, 4, 4a, 5, 5a and 5b relate to a coupling between a pipe end portion 14 and a wall port represented in the drawing by a block-shaped wall member 10. The latter may be part of a valve structure, a distributor block, or a hydraulic cylinder assembly, for example.

Figure 3:
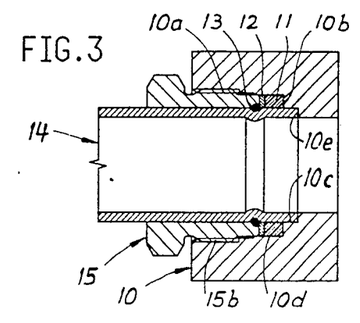
FIG. 3 shows the pipe coupling of FIG. 1 in a longitudinal section.

As can be seen in FIG. 3, for example, the wall member 10 has an interior thread 10a which is engaged by the male thread 15b of a threaded clamping sleeve 15. The pipe end portion 14 which is surrounded by the threaded clamping sleeve 15 reaches axially into a centering bore 10c of the wall member 10. A stepped, i.e.

less deeply recessed chamber bore 10d with a radial shoulder 10b defines two sides of a cross-sectionally rectangular gasket chamber 24. A third side is formed by the cylindrical outer surface of the pipe end portion 14. Inside this gasket chamber 24 is arranged an annular gasket 11 of matching cross section.

As the threaded clamping sleeve 15 is screwed into the wall member 10, its radial pressure face 15c advances axially against the gasket chamber 24, pushing ahead of it a pressure ring 12 which forms the forth side of the gasket chamber 24. The radial width of the pressure ring 12 corresponds to the radial distance between the chamber bore 10d and the outer diameter of the pipe end portion 14.

The threaded clamping sleeve 15 is free to rotate on the pipe end portion 14 and also freely movable in the axial direction away from the pipe extremity. In the opposite direction, it engages the pipe end portion 14 by means of a thrust-transmitting abutment in the form of a snap ring 13 of hardened spring wire which is engaged by about one-half of its diameter inside an annular groove 14a of the pipe end portion 14, as can be seen in FIG. 3a, for example.

Figure 3A:
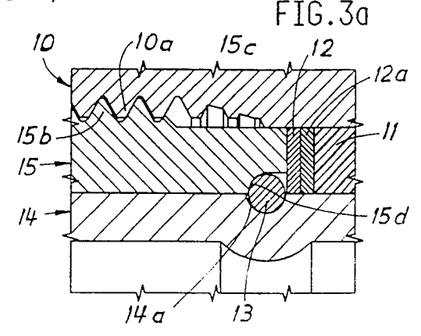
FIG. 3a shows an enlarged detail of FIG. 3, modified to include an intermediate ring.
Figure 3B:
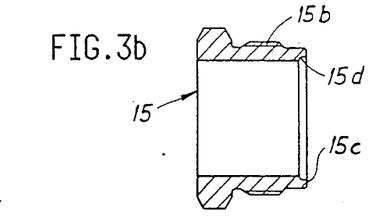
FIGS. 3b and 3c show the threaded clamping sleeve of the pipe coupling in a longitudinal section and in an end view, respectively.
Figure 3C:
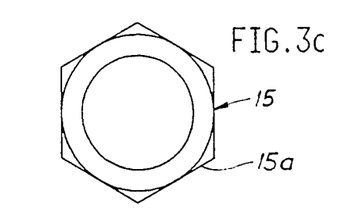
Figures 3D, 3E:
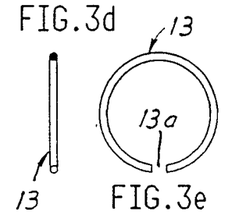
FIGS. 3d and 3e show the snap ring in a cross section and in an end view, respectively.
Figures 3F, 3G:
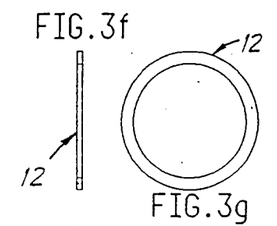
FIGS. 3f and 3g show the pressure ring in elevation and in an end view, respectively.
Figures 3H, 3K:
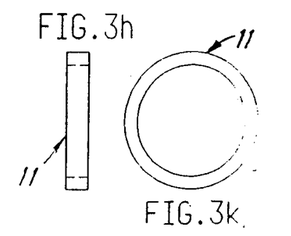
FIGS. 3h and 3k show the annular gasket in elevation and in an end view, respectively.
Figure 3M:
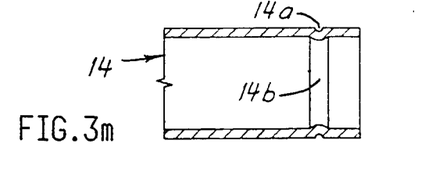
FIGS. 3m and 3n show a pipe end portion in a longitudinal section and in an end view, respectively.
Figure 3N:
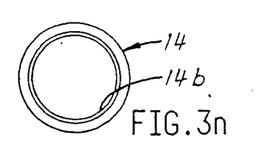
Figure 5:
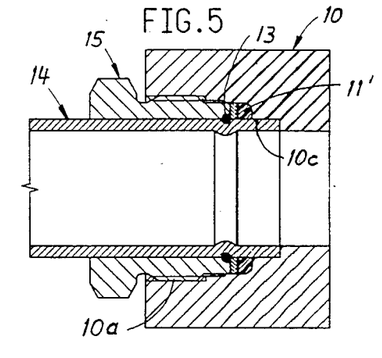
FIG. 5 is similar to FIG. 4, showing an alternative modification featuring a differently shaped gasket chamber.
Figure 5A:
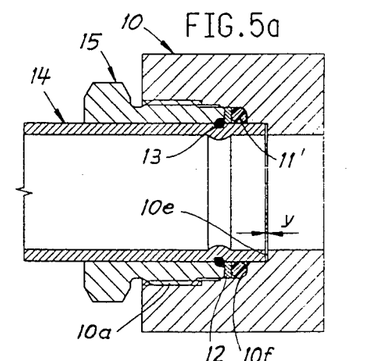
FIG. 5a is similar to FIG. 4a, showing the pipe coupling of FIG. 5 in an assembly position prior to the deformation of the gasket.

With the other half of its diameter, the snap ring 13 engages a rounded thrust shoulder 15d which is axially recessed from the pressure face 15c of the threaded clamping sleeve 15 by a distance which is equal to or larger than the diameter of the snap ring 13 (FIGS. 3a and 5a).

The annular groove 14a of the pipe end portion 14 has a rounded cross section which approximates the circular cross section of the snap ring 13. It is preferably obtained in a cold-working operation in which the groove 14a is coined into the outer surface of the pipe end portion 14 with the aid of a matchingly shaped coining roll, or rolls, as will be described in more detail further below. This cold-working operation has the advantage of shaping the pipe end portion 14 without cutting its longitudinal fiber structure, producing a corresponding small interior bead 14b in the process.

The rotatability of the threaded clamping sleeve 15 on the pipe end portion 14, in conjunction with the use of the snap ring 13 as a thrust transfer means, makes is possible to tighten the threaded clamping sleeve 15, while the pipe end portion 14 executes only an axial clamping displacement. On the other hand, when the threaded clamping sleeve 15 is unscrewed in the process of disconnecting the pipe coupling, it can freely move away from the snap ring 13.

Figure 5B:
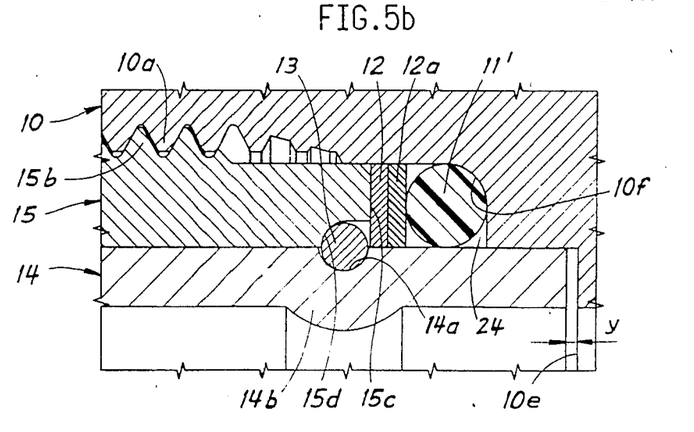
FIG. 5b shows an enlarged detail of FIG. 5a, modified to include an intermediate ring.

The pressure ring 12, preferably a metallic ring, assures that the clamping pressure exerted by the advancing threaded clamping sleeve 15 is distributed evenly over the radial width of the annular gasket 11. For pipe couplings which are intended for very high pressures, the invention suggests the use of a non-metallic intermediate ring 12a between the pressure ring 12 and the annular gasket 11, as can be seen in FIGS. 3a and 5b.

The intermediate ring 12a is preferably a thin ring of high-polymer plastic having a shore hardness which is considerably higher than that of the adjacent annular gasket 11. However, under the axial pressure of the coupling components, the intermediate ring 12a undergoes a certain axial compression and a corresponding radial extension which is sufficient for its inner and outer peripheries to engage the inner and outer cylindrical surfaces of the gasket chamber 24, for a clearance-free engagement with these surfaces. This feature, by eliminating the displacement gap between the intermediate ring 12a and the chamber bore 10d, precludes the possibility that a portion of the gasket material is extruded into that displacement gap, thereby making it possible to subject the annular gasket 11 to very high compressive stress, even if its shore hardness is comparatively low.

In the pipe coupling which is shown in FIGS. 1, 3 and 3a–3n, the cross sections of both the gasket chamber 24 and the annular gasket 11 are rectangular and substantially identical, so that the annular gasket 11 occupies substantially the entire gasket chamber 24, even before is is compressed. It follows that only a very small axial compression displacement is required to produce sufficient radial extension of the annular gasket 11 for an elevated sealing pressure between it and the gasket chamber 24.

Figure 4:
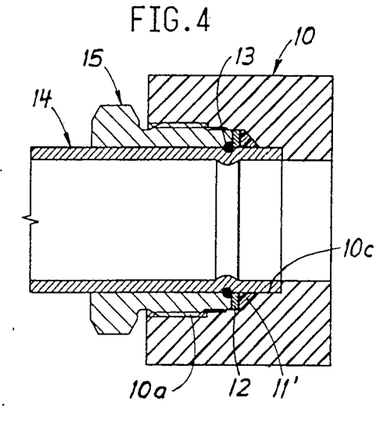
FIG. 4 shows, in a longitudinal section, a modification to the pipe coupling shown in FIGS. 1 and 3 featuring a deformed gasket inside the gasket chamber.
Figure 4A:
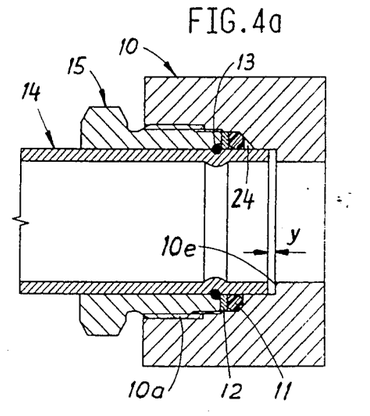
FIG. 4a shows the pipe coupling of FIG. 4 in an assembly position prior to the deformation of the gasket.

In contrast, the pipe coupling of FIGS. 4 and 4a shows a gasket chamber 24 of a five-sided cross section, the radial shoulder 10b of the wall member 10 being replaced by an inclined shoulder. At the same time, the annular gasket 11' is an O-ring of circular cross section. A comparison between FIG. 4 and FIG. 4a shows how the initially circular shape of the gasket 11' is compressed and deformed into a near-triangular shape. This configuration of the gasket chamber minimizes the extrusion risk at the displacement gap between the centering bore 10c and the outer surface of the pipe end portion 14.

FIGS. 5, 5a and 5b show a pipe coupling which uses the same annular gasket 11' as the pipe coupling of FIGS. 4 and 4a. The gasket chamber 24 receiving the O-ring 11' is of substantially square cross section, with the exception of the two chamber faces which are formed by the wall member 10 and joined by a fillet 10f the curvature of which corresponds substantially the cross-sectional radius of the O-ring 11'. The purpose of the fillet 10f is to preclude the formation of a pocket of trapped air in this corner, since this is the only corner of the gasket chamber 24 which is not adjoined by a displacement gap or by an interface between two separate parts (see FIG. 5b).

Generally, when the cross-sectional shape of the gasket chamber differs substantially from the cross-sectional shape of the annular gasket, it may not be necessary for the annular gasket to be compressed in its volume, i. e. for the cross section of the free gasket to be larger than the cross section of the gasket chamber.

This is the case, for example, when an O-ring of circular cross section is used as a gasket inside a gasket chamber of rectangular or triangular cross section. In this case, it is frequently not necessary for the O-ring to be compressed and deformed to a point where the material of the gasket is pressed into the very corners of the gasket chamber. The elastic forces resulting from the deformation of the O-ring will produce sufficient radial pressure against the inner and outer walls of the gasket chamber to produce a reliable seal, even if the O-ring does not touch one or more corners of the gasket chamber.

Figure 1:
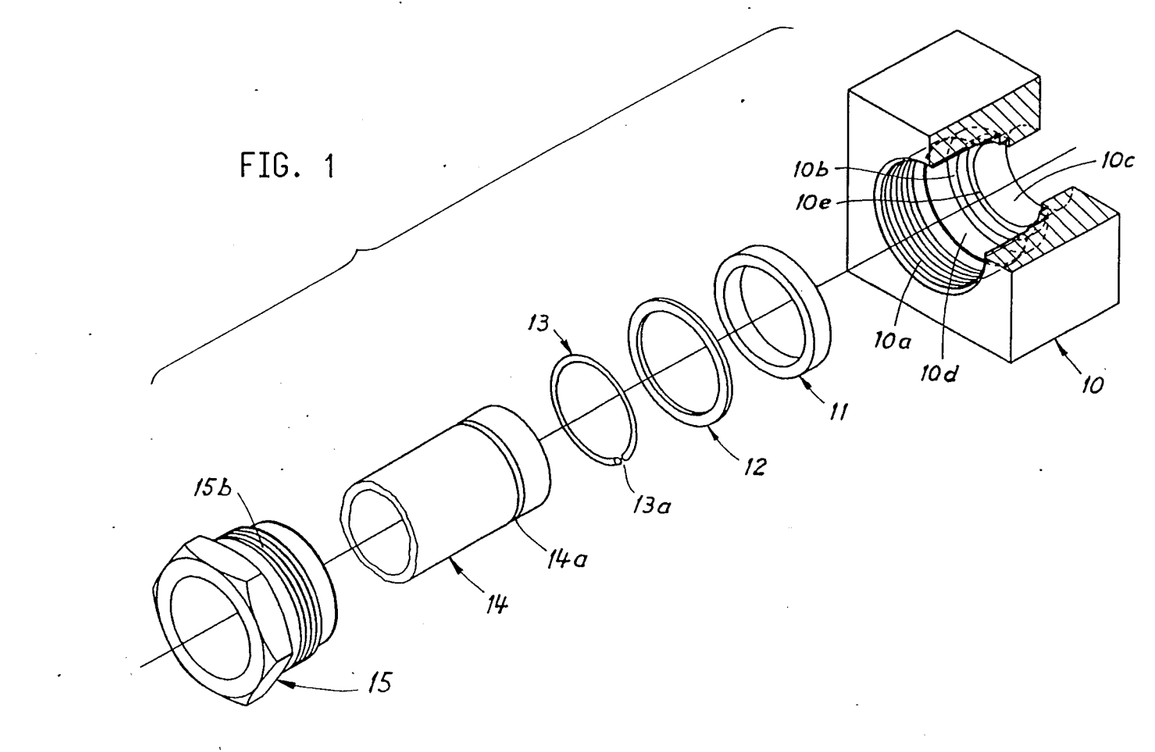
FIG. 1 shows in an exploded perspective representation, the component parts of a first embodiment of the invention in the form of a pipe coupling connecting a pipe end portion to a wall port.
Figure 2:
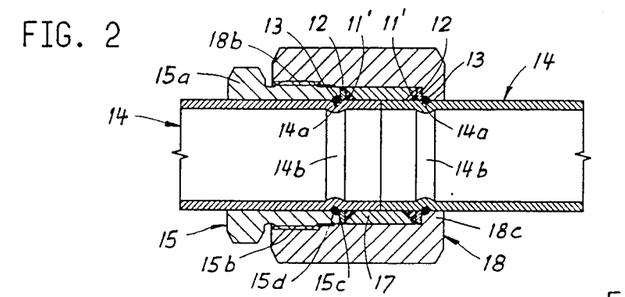
FIG. 2 shows, in a longitudinal section, a second embodiment of the invention in the form of a pipe coupling connecting two pipe end portions.

The second major embodiment of the invention, illustrated in FIG. 2, relates to a pipe coupling between two aligned pipe end portions 14. Here, the place of the wall member 10 (FIG. 3) is taken by a coupling nut 18 which surrounds a centering sleeve 17 inside which the extremities of the two pipe end portions 14 are engaged. The male thread 15b of the threaded clamping sleeve 15 cooperates with a female thread 18b of the coupling nut 18 to produce the axial clamping force for the connection of this pipe-to-pipe coupling. Both coupling components are rotatable on their associated pipe end portions 14.

The configuration of the threaded clamping sleeve 15 and of its axial abutment means with the associated pipe end portion 14, consisting of a thrust shoulder 15d which cooperates with a snap ring 13 seated in an annular groove 14a of the pipe end portion 14, are unchanged from the previously described wall port application of the pipe coupling. The same abutment means are provided between the coupling nut 18 and its associated pipe end portion 14, the snap ring 13 being engaged by a thrust shoulder on the inner side of an end flange 18c of the coupling nut 18.

The centering sleeve 17 has two identical axial end faces which delimit two identical gasket chambers 24. These gasket chambers have a generally triangular cross section, each holding an O-ring as a gasket 11'. No fillets are required in this pipe coupling, as all the gasket chamber corners are adjoined by either a displacement gap or an interface between two separate parts.

Two pressure rings 12 placed between the O-rings and the pressure face 15c of the clamping sleeve 15 and the inner radial face of the end flange 18c of the coupling nut 18, respectively, serve to evenly distribute the axial clamping force of the clamping components 15 and 18 over the entire height of the gasket chambers 24. For certain applications, it may be advantageous to produce both the centering sleeve 17 and the pressure rings 12 of plastic material.

In the connected position of the pipe coupling, the end faces of the two pipe end portions 14 abut against each other. The centering sleeve 17 has a "floating" relationship with the pipe end portions 14 and with the surrounding coupling nut 18, being axially slidable in relation to both, so as to equalize the compression of the two annular gaskets 11'.

It should be understood that the additional use of intermediate rings 12a of plastic, as previously described in connection with FIGS. 3a and 5a, is also applicable to the pipe coupling of FIG. 2.

All the clamping and sealing components of the novel pipe coupling are readily removable form their pipe end portions 14, following the disconnection of the pipe coupling. The O-rings 11, the pressure rings 12, and the centering sleeve 17 are removable immediately, as the coupling nut 18 can slide back from it normal position. Then, as soon as the split snap rings 13 are disengaged form their annular grooves 14a, the threaded clamping sleeve 15 and the coupling nut 18 are free to slide over the extremities of their associated pipe end portions 14.

Inversely, the same clamping and sealing components of the pipe coupling can easily be installed in the field, so that it is not necessary to pre-assemble the clamping components to their pipe end portions in the factory. Accordingly, this feature also makes it possible to quickly replace any damaged components of a pipe coupling in the field.

It should be understood that, instead of using a split snap ring 13 with a radial gap 13a (FIG. 1), it is also possible to use a two-part ring with two radial gaps. In the latter case, it is necessary for the thrust shoulder 15d of the threaded clamping sleeve 15 to remain in axial engagement with the ring halves, in order to retain the latter inside their annular groove 14a during the assembly of the pipe coupling. The same applies to the coupling nut 18.

From the foregoing, it is evident that the present invention makes it possible to achieve a considerable degree of assembly simplification and parts standardization, while being suitable for different pipe coupling applications. While only few parts are required, these parts are comparatively simple and easy to manufacture. The result is a reliable, readily disconnectable and reconnectable pipe coupling of low cost.

In connection with the novel pipe coupling described hereinabove, the present invention further suggests a simple groove coining tool by means of which it is possible to produce the annular groove 14a in the pipe end portion 14 in a cold-working operation which can be performed in the field. Such a hand tool is shown in FIGS. 6 and 7.

Figure 6:
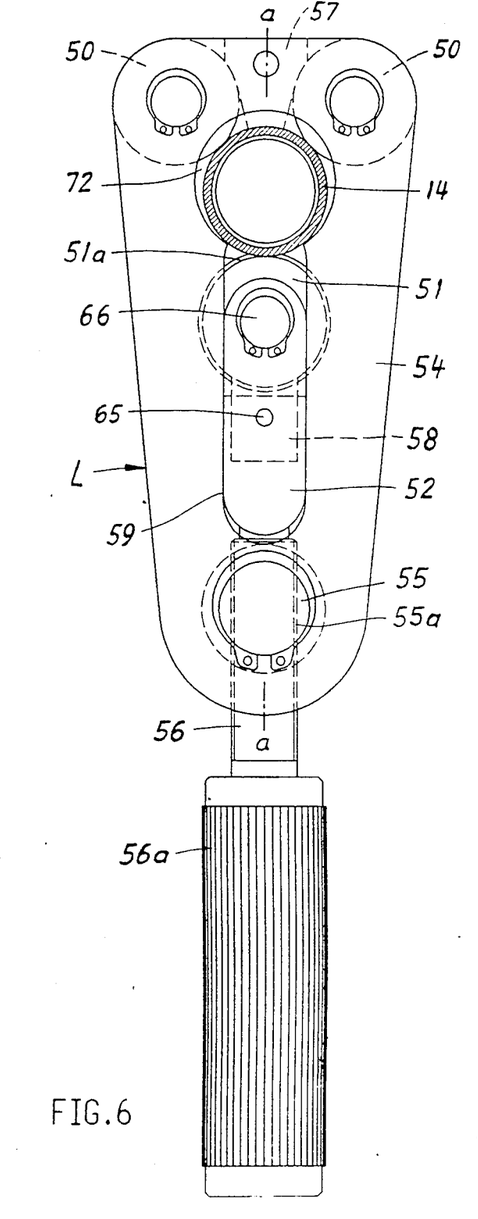
FIG. 6 shows, in an elevational view, a special groove coining tool designed for the impression of an annular groove into the wall of a pipe end portion, as part of the present invention.
Figure 7:
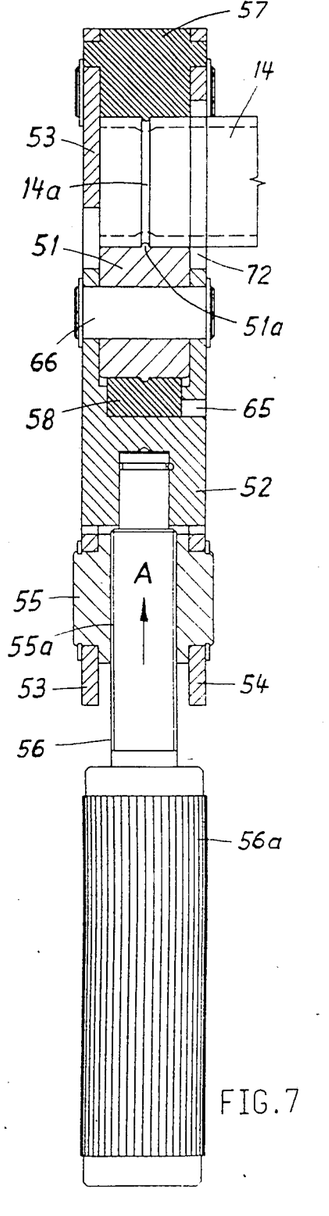
FIG. 7 shows the groove coining tool of FIG. 6 in a side view.

FIGS. 6 and 7 show that the groove coining tool has a tool frame L which consists essentially of two elongated face plates 53 and 54 forming journal supports for two cylindrical supporting rolls 50. The latter are arranged on opposite sides of the longitudinal center axis a—a of the tool.

In alignment with the center axis a—a, and at a distance from the supporting rolls 50, is arranged a cylindrical coining roll 51 with a peripheral coining ridge 51a. The shaft 66 of the coining roll 51 is supported in a bearing block 52 which is slidingly displaceable along the center axis a—a, being guided by the flanks of guide slots 59 in the two face plates 53 and 54.

Connected to the rear extremity of the slidable bearing block 52 is a threaded shaft 56 with a rearwardly protruding adjustment handle 56a. The threaded shaft 56 cooperates with the female thread 55a of a threaded block 55 which is supported by the face plates 53 and 54. A clockwise rotation of the adjustment handle 56a displaces the bearing block 52 in the direction of advance A.

The bearing block 52 further includes a cavity adjacent to the coining roll 51 inside which is arranged a wiper member 58. Through a lateral bore 65, the wiper member 58 can be supplied with lubricant for the cleaning and lubrication of the coining roll 51.

The coining tool of the invention operates as follows: The end portion 14 of a pipe which is to receive an annular groove 14a is inserted laterally through a central opening 72 in the face plate 54, until its end face abuts against the other face plate 53. This position is shown in FIG. 7. Then, the coining roll 51 is advanced against the pipe end portion 14 through rotation of the adjustment handle 56a, so that its coining ridge 52 presses against the outer surface of the pipe end portion 14, while the latter is supported by the two supporting rolls 50.

Under rotation of the pipe end portion 14 relative to the coining tool, the coining roll 51 is progressively advanced in the direction A, until the cylindrical outer survanced face of the coining roll 51 engages the outer surface of the pipe end portion 14. At this point, the annular groove 14a is fully formed.

This cold-working operation produces the desired groove without removing any metal from the pipe end portion 14 and without weakening the pipe by cutting its longitudinal fibers. Instead, the metal is displaced radially inwardly, forming a small interior bead 14b (FIG. 5b). At the same time, the rolling operation causes the surface portions of the pipe in contact with the rolls 50 to be compacted and smoothed.

The relative rotational movement between the pipe end portion 14 and the coining tool can be produced either by rotating the pipe, while the coining tool is held steady, or by rotating the coining tool about the clamped pipe end portion 14.

It is to be understood that the invention is not limited in its application to the details of construction and arrangement of parts illustrated in the accompanying drawings, since the invention is capable of other embodiments and of being practiced or carried out in various ways. It is also to be understood that the phraseology or terminology employed herein is for the purpose of description and not of limitation.

I claim the following:

1. A pipe coupling adapted for use as a repeatedly disconnectable and reconnectable union between two pipe ends or a pipe end and a wall port of a hydraulic system which is capable of sustaining elevated hydraulic pressures, the pipe coupling comprising in combination:
   a first coupling member in the form of a pipe end portion having a cylindrical outer diameter and an inner axial extremity with an inner end face;
   a second coupling member in the form of a body with an axially outwardly open bore into which the first coupling member is insertable, inner extremity first, the second coupling member having a female thread in the outer axial end portion of said bore;
   a clamping member in the form of a sleeve having a bore which rotatably supports the clamping member on the outer diameter of the first coupling member, the clamping member having a male thread which can be screwed into the female thread of the second coupling member to create an axial inward movement of the clamping member;
   an annular groove in the pipe end portion and a split snap ring arranged in the annular groove in such a way that it protrudes from the groove by approximately one-half of its radial height;
   an axial recess in the bore of the clamping member, on the inner axial side thereof, the axial recess having a diameter accomodating the engaged snap ring, the clamping member having an axially inwardly facing shoulder cooperating with the protruding portion of the snap ring to transmit an axial inward movement of the clamping member to the first coupling member;
   an annular gasket which is confined and compressed within an annular gasket chamber formed between said first and second coupling members and the clamping member; and
   a pressure ring arranged between the inner extremity of the clamping member and the annular gasket; and wherein
   the bore of the second coupling member includes a first cylindrical bore portion on the axially inner side of said female thread, said first bore portion surrounding the outer diameter of the pipe end portion with an annular gap, so as to define concentrically spaced outer and inner walls of said gasket chamber;
   the bore of the second coupling member further includes a second, smaller cylindrical bore portion adjoining said first bore portion on its axially inner side, the second bore portion cooperating with the cylindrical outer diameter of the pipe end portion to define a first displacement interface of minimal radial clearance;
   the bore of the second coupling member further includes an annular face between said first and second bore portions defining the inner axial side of the gasket chamber;
   the pressure ring has an axially inwardly facing pressure face defining the outer axial side of the gasket chamber;
   the inner diameter of the pressure ring forms an interface of minimal radial clearance with the outer diameter of the pipe end portion, and the outer diameter of the pressure ring cooperates with the first bore portion of the second coupling member to form a second displacement interface of minimal radial clearance; and
   the resultant axially shortenable gasket chamber encloses the annular gasket on all sides in such a way that, even under elevated compression forces exerted on the gasket by the gasket chamber walls and by high-pressure fluid contained inside the pipe coupling, extrusion of the gasket material between the constituent surfaces of the gasket chamber is precluded.

2. A pipe coupling as defined in claim 1, wherein the annular gasket chamber has a cross-sectional outline of substantially rectangular shape.

3. A pipe coupling as defined in claim 1, wherein
   the end face of the pipe end portion serves as a pipe positioning face; and
   the second coupling member has an oppositely oriented abutment face which cooperates with the pipe positioning face to establish a predetermined axial length of the annular gasket chamber in the screwed-in end position of the clamping member.

4. A pipe coupling as defined in claim 3, wherein
   the positioning face of the pipe end portion and the abutment face of the second coupling member are parallel, planar faces.

5. A pipe coupling as defined in claim 1, wherein
   the annular groove in the pipe end portion has a substantially semi-circular profile; and
   the split snap ring has a round cross-section.

6. A pipe coupling as defined in claim 1, wherein
   the pressure ring includes a non-metallic intermediate ring of limited deformability arranged on the inner axial side of the pressure ring and forming the pressure face of the pressure ring, the hardness of the intermediate ring being higher than that of the annular gasket; and wherein
   the intermediate ring is sized in such a way that, under the axial compression exerted by the clamping member, the intermediate ring is radially expanded into clearance-free engagement at the interface between the inner diameter of the intermediate ring and the outer diameter of the pipe end portion and into clearance-free engagement at the displacement interface between the outer diameter of the intermediate ring and the first bore portion of the second coupling member.

7. A pipe coupling as defined in any one of claims 1, 3, 5 or 6 wherein
   the second coupling member is formed by the wall of a housing, the bore of the second coupling member being a wall port in said housing.

8. A pipe coupling as defined in any one of claims 1, 3, 5 or 6 wherein
   the second coupling member is formed by a second pipe end portion carrying a coupling nut;
   the female thread and at least the first bore portion of the bore of the second coupling member are part of the coupling nut; and the second pipe end portion has an inner axial extremity with an end face which serves as an abutment face in cooperation with the end face of said pipe end portion which serves as the first coupling member.

9. A pipe coupling as defined in claim 8, wherein
the second pipe end portion forming part of the second coupling member has the same outer diameter as the first pipe end portion which serves as the first coupling member;
the second bore portion of the bore of the second coupling member and the annular face between the first and second bore portions are likewise part of the coupling nut, the second bore portion cooperating with the outer diameter of the second pipe end portion to rotatably support the coupling nut on the second pipe end portion;
the second coupling member further includes a tubular centering sleeve with opposite axial end faces and an outer diameter on which the centering sleeve is positioned with minimal radial clearance in said first bore portion of the coupling nut and an inner diameter on which the centering sleeve is straddlingly positioned with minimal radial clearance on the outer diameter of both pipe end portions;
the axial length of the centering sleeve is less than the axial length of the first bore portion of the coupling nut, the centering sleeve being axially so positioned in relation to said first bore portion that said annular gasket chamber is formed between the inner end face of the clamping member and one end face of the centering sleeve and a second annular gasket chamber is formed between the other end face of the centering sleeve and said annular face of the bore; and
each gasket chamber holds an annular gasket, the centering sleeve being positioned between the annular gaskets in an axially floating manner, so as to render both gasket chambers axially shortenable under an axial inward movement of the clamping member.

10. A pipe coupling as defined in claim 9, wherein
both pipe end portions have identical radially open annular grooves, split snap rings engaged in said grooves in such a way that they protrude from the grooves by about one-half of their radial height; and
the coupling nut cooperates with the snap ring on the second pipe end portion to transmit axially inwardly directed forces to said pipe end portion, in the same manner in which the clamping member cooperates with the snap ring on the first pipe end portion.

* * * * *